United States Patent
Dautriche et al.

(10) Patent No.: US 11,616,516 B2
(45) Date of Patent: Mar. 28, 2023

(54) DEVICE AND METHOD FOR RECEIVING DATA IN A RADIO FREQUENCY TRANSMISSION

(71) Applicant: STMICROELECTRONICS SA, Montrouge (FR)

(72) Inventors: Pierre Dautriche, Montbonnot (FR); Sylvain Engels, Meylan (FR)

(73) Assignee: STMICROELECTRONICS SA, Montrouge (FR)

(*) Notice: Subject to any disclaimer, the term of this patent is extended or adjusted under 35 U.S.C. 154(b) by 0 days.

(21) Appl. No.: 17/664,987

(22) Filed: May 25, 2022

(65) Prior Publication Data

US 2022/0286149 A1    Sep. 8, 2022

Related U.S. Application Data

(63) Continuation of application No. 17/328,612, filed on May 24, 2021, now Pat. No. 11,374,597.

(30) Foreign Application Priority Data

Jun. 19, 2020 (FR) .................................. 2006434

(51) Int. Cl.
*H04B 1/00* (2006.01)
*H04B 1/04* (2006.01)
*G06N 3/02* (2006.01)

(52) U.S. Cl.
CPC .............. *H04B 1/0007* (2013.01); *G06N 3/02* (2013.01); *H04B 1/0475* (2013.01)

(58) Field of Classification Search
CPC ....... H04B 1/0007; H04B 1/0475; G06N 3/02
See application file for complete search history.

(56) References Cited

U.S. PATENT DOCUMENTS

| | | |
|---|---|---|
| 5,909,675 A | 6/1999 | Chiodini |
| 10,217,346 B1 | 2/2019 | Zhang et al. |
| 2007/0208678 A1 | 9/2007 | Matsugu |

(Continued)

FOREIGN PATENT DOCUMENTS

| | | |
|---|---|---|
| CA | 2435796 A1 | 6/2003 |
| CN | 1953357 A | 4/2007 |
| CN | 101052979 A | 10/2007 |

(Continued)

OTHER PUBLICATIONS

Yao, L., et al., "A 1.8-v 6-bit flash ADC with rail-to-rail input range in 0.18um CMOS", IEEE Proceedings of the 5th International Conference on ASIC, Oct. 21-24, 2003, 4 pages.

(Continued)

*Primary Examiner* — Jaison Joseph
(74) *Attorney, Agent, or Firm* — Slater Matsil, LLP

(57) ABSTRACT

According to one aspect, an embodiment radio frequency receiver device comprises an input interface configured to receive a radio frequency signal of a given type and convert same into an electric signal, a detector configured to detect at least one voltage level in the electric signal, a pulse generator configured to generate at least one pulse train representative of the voltage levels detected, and a processing unit configured to determine the type of the radio frequency signal from the at least one pulse train.

21 Claims, 4 Drawing Sheets

(56) References Cited

U.S. PATENT DOCUMENTS

2019/0319658 A1* 10/2019 Calabro .................. H04B 1/16

FOREIGN PATENT DOCUMENTS

| | | |
|---|---|---|
| CN | 205750775 U | 11/2016 |
| CN | 110166154 A | 8/2019 |
| CN | 110390253 A | 10/2019 |
| CN | 110611627 A | 12/2019 |
| CN | 110826425 A | 2/2020 |
| CN | 113114599 A | 7/2021 |
| FR | 2892587 A1 | 4/2007 |
| KR | 101313051 B1 | 9/2013 |
| WO | 2013045362 A1 | 4/2013 |
| WO | 2018136785 A1 | 7/2018 |
| WO | 2020104036 A1 | 5/2020 |

OTHER PUBLICATIONS

Yang, Xingyu et al., "New Jamming Identification Algorithm Based on Local Binary Pattern Feature", College of Electronic Countermeasure, National University of Defense Technology, China, Computer Engineering, vol. 44, No. 7, Jul. 2018, 7 pages.

* cited by examiner

DEVICE AND METHOD FOR RECEIVING DATA IN A RADIO FREQUENCY TRANSMISSION

CROSS-REFERENCE TO RELATED APPLICATIONS

This application is a continuation of U.S. patent application Ser. No. 17/328,612, filed May 24, 2021, which application claims the priority benefit of French Patent Application No. 2006434, filed on Jun. 19, 2020, all of which applications are hereby incorporated herein by reference.

TECHNICAL FIELD

The embodiments and methods of implementing the invention relate to radio frequency transmission, and in particular software-defined radios.

BACKGROUND

A software-defined radio (SDR) is a receiver device or optionally a radio frequency transmitter that is primarily implemented by software and, to a lesser degree, by hardware.

In particular, a receiver device of the software-defined radio type generally comprises an antenna configured to receive a modulated radio frequency signal and a radio frequency-to-digital converter to convert the received radio frequency signal into a raw digital signal. The receiver device of the software-defined radio type can further comprise an amplitude demodulator. The resulting demodulated digital signal can then be processed by software.

Such processing operations can be carried out using a microprocessor dedicated to processing the signal such as a DSP (Digital Signal Processor), a dedicated integrated circuit such as an ASIC (Application Specific Integrated Circuit), a programmable electronic circuit such as an FPGA (Field Programmable Gate Array), or using a computer processor.

Software-defined radios have the advantage of only requiring a change or adaptation to the software in order to work with a different radio system. For example, software-defined radios can be designed to receive Wi-Fi signals, LTE (Long Term Evolution) signals, and Bluetooth signals.

Nonetheless, known software-defined radios consume large amounts of power.

In particular, the radio frequency-to-digital converters of software-defined radios require the generation of sampling clocks which consume large amounts of power.

More particularly, high-frequency sampling clocks must often be used to obtain a digital signal that is representative of the original radio frequency signal.

Moreover, sampling requires limiting the bandwidth of the signal.

Furthermore, it is possible that certain radio frequency signals are sampled to obtain digital signals which are then demodulated even though the receiver device is not the intended recipient of this signal. The power supplied to sample the radio frequency signal and then demodulate the digital signal is thus consumed unnecessarily.

Yet, in some applications, power consumption should preferably be limited as far as possible. In particular, software-defined radios can be used in the Internet of things to enable communication between an object and the Internet network.

There is thus a need to propose a method for receiving a radio frequency signal that reduces power consumption compared to known receiving methods.

SUMMARY

According to one aspect, an embodiment method for receiving data in a radio frequency transmission comprises receiving a radio frequency signal of a given type and converting the radio frequency signal into an electric signal, detecting, at least once, at least one voltage level in the electric signal, generating at least one pulse train representative of each detection, and determining the type of the radio frequency signal from the at least one pulse train.

The type of the radio frequency signal can conform either to a standard or to a protocol. For example, the radio frequency signal can be a Wi-Fi or Bluetooth or LTE (Long Term Evolution) signal.

The pulse train is associated with the radio frequency signal.

Determining the type of the radio frequency signal makes it possible to determine whether or not the radio frequency signal requires processing.

Thus, by determining the type of the radio frequency signal based on the generation of a pulse train, there is no longer a need, for any radio frequency signal received, to sample the radio frequency signal in order to obtain a digital signal, and then demodulate the digital signal.

Thus, the receiving method avoids the need to generate a sampling clock to determine the type of the radio frequency signal.

Such a method thus reduces the power consumed in order to determine the type of a radio frequency signal. Such a method further reduces the number of samples to be analyzed by analyzing only a small number of pulses.

Such a method further avoids restrictive conditions regarding the bandwidth of the radio frequency signal received.

Preferably, such a method can be used to detect a plurality of radio frequency signal types. Nonetheless, a receiving method can be provided, wherein only one type of signal can be determined.

In one advantageous method of implementing the invention, the radio frequency signal includes a header representative of the type of the radio frequency signal, the generation comprising generating at least one pulse train associated with the header of the radio frequency signal received.

In one advantageous method of implementing the invention, determining the type of the radio frequency signal comprises implementing an artificial neural network.

Preferably, the neural network is trained beforehand to recognize at least one type of radio frequency signal from already classified pulse trains.

In one advantageous method of implementing the invention, the artificial neural network comprises a succession of layers including an input layer for retrieving the generated pulse trains, at least one hidden convolutional and/or propagation layer for generating corrected pulse trains comprising pulses representative of the type of the radio frequency signal and an output layer for transmitting the corrected pulse trains.

In one advantageous method of implementing the invention, the type of the radio frequency signal is identified from the corrected pulse trains.

Preferably, detecting at least one voltage level of the electric signal comprises comparing the electric signal with at least one threshold.

In one advantageous method of implementing the invention, the method comprises, once the type of the signal has been determined, sampling then processing the electronic signal in accordance with the determined type of the radio frequency signal.

Alternatively, the method comprises decoding the radio frequency signal from the at least one corrected pulse train, as a function of the determined type of the radio frequency signal.

In one method of implementing the invention, the radio frequency signal is selected from among a Wi-Fi signal, a Bluetooth signal and an LTE signal.

According to another aspect, an embodiment radio frequency receiver device comprises an input interface configured to receive a radio frequency signal of a given type and convert same into an electric signal, a detector configured to detect at least one voltage level in the electric signal, a pulse generator configured to generate at least one pulse train representative of the voltage levels detected, and a processing unit configured to determine the type of the radio frequency signal from the at least one pulse train.

The input interface can comprise an antenna configured to receive the radio frequency signal and convert same into an electric signal. The input interface can further comprise an amplifier, in particular a low-noise amplifier, configured to amplify the electric signal transmitted by the antenna.

In one advantageous embodiment, the input interface is configured to receive a radio frequency signal including a header representative of the type of the radio frequency signal. The pulse generator is thus configured to generate at least one pulse train associated with the header of the radio frequency signal received.

In one advantageous embodiment, the processing unit is configured to implement an artificial neural network to determine the type of the radio frequency signal.

In one advantageous embodiment, the artificial neural network comprises a succession of layers including an input layer for retrieving the generated pulse trains, at least one hidden convolutional and/or propagation layer for generating corrected pulse trains comprising pulses representative of the type of the radio frequency signal and an output layer for transmitting the corrected pulse trains.

In one advantageous embodiment, the receiver device comprises a decoder configured to identify the type of the radio frequency signal from the pulses of the corrected pulse trains.

The processing unit can be configured to implement this decoder.

In one advantageous embodiment, the detector comprise at least one comparator configured to detect at least one voltage level of the electric signal by comparing the electric signal with at least one threshold.

The pulse generator thus receives, at the input, the output signals from the comparator and generates a pulse when the output signals from the comparator indicate that the voltage level of the radio frequency signal is greater than at least one threshold.

In one advantageous embodiment, the receiver device further comprises a signal processor, configured such that, once the type of the radio frequency signal has been determined, it samples and then processes the electric signal in accordance with the determined type of the signal, in particular if the determined type of the radio frequency signal is one that can be processed by the signal processor.

Sampling can be carried out using a sampling clock produced by a clock generator of the receiver device. The clock generator can be switched off until the type of the signal has been determined, in order to reduce the power consumption of the receiver device.

The comparators, the pulse generator and the processing unit are thus used as a radio wake-up system (better known by a person skilled in the art as a "wake-up radio") to indicate that a radio frequency signal of an expected type (i.e. one that can be processed by the signal processor) has been received.

The receiver device is thus configured to switch off the clock generator until a radio frequency signal of an expected type is received.

Alternatively, the receiver device can comprise a decoder configured to decode the radio frequency signal from the at least one corrected pulse train, as a function of the determined type of the radio frequency signal.

The receiver device is thus configured to extract all useful information from the radio frequency signal based on the at least one generated pulse train.

In one embodiment, the radio frequency signal is selected from among a Wi-Fi signal, a Bluetooth signal and an LTE signal.

According to another aspect, the invention proposes an object comprising a receiver device such as that described hereinabove.

Such an object can in particular be used in the Internet of things. In particular, such an object is thus configured to receive data from a remote server or appliance, for example, via the Internet. In particular, such an object makes it possible for data to be received via a radio frequency signal while consuming little power.

BRIEF DESCRIPTION OF THE DRAWINGS

Other advantages and features of the invention will become apparent upon examining the detailed description of non-limiting embodiments and methods of implementing the invention, and from the accompanying drawings in which.

DETAILED DESCRIPTION OF ILLUSTRATIVE EMBODIMENTS

Figure 1:
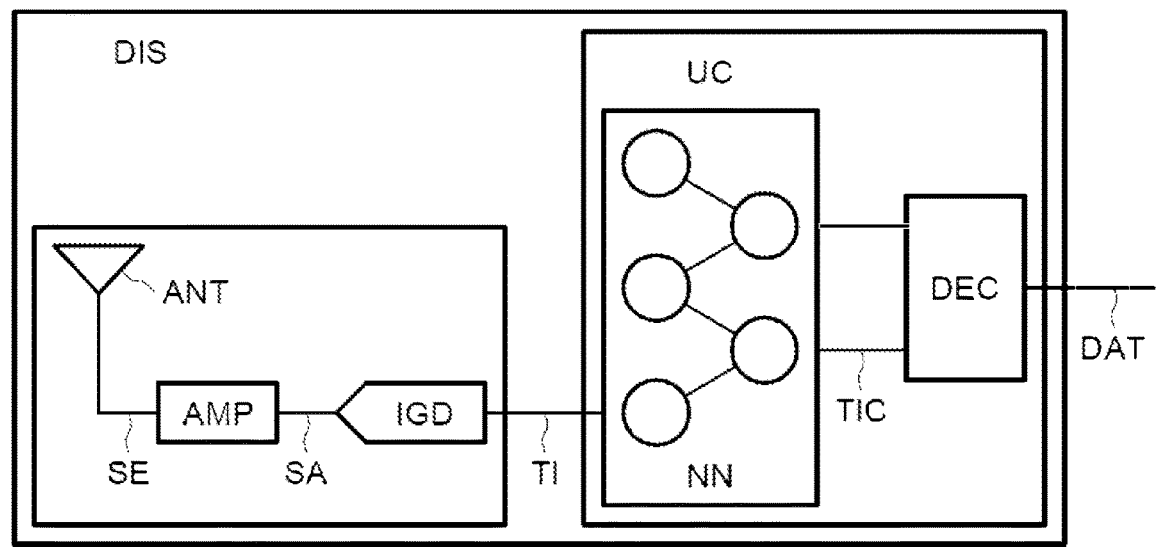
FIG. 1 illustrates a receiver device that can be used as a software-defined radio.

FIG. 1 shows a receiver device $DIS_1$ according to one embodiment of the invention, which can be used as a software-defined radio.

The receiver device $DIS_1$ comprises an antenna ANT configured to receive a radio frequency signal and convert this signal into an electric signal SE.

The radio frequency signal is of a given type. The type of the radiofrequency signal can be conformant to a standard or a protocol. For example, the radio frequency signal can be a Wi-Fi or Bluetooth or LTE (Long Term Evolution) signal.

The radio frequency signal is of a given type and carries a header representative of the type of the radio frequency signal. The radio frequency signal also carries useful information, i.e. data that can be used by the receiver device.

The type of the radio frequency signal and the useful information of the radio frequency signal are represented in the form of symbols.

The radio frequency signal received can comprise noise and errors introduced during the transmission of the radio frequency signal.

The receiver device further comprises a wide-band low-noise amplifier AMP connected to the antenna. The amplifier AMP is configured to receive, at the input, the electric signal SE generated by the antenna ANT and to amplify this electric signal SE. The resulting amplified signal SA is output from the amplifier AMP.

Figure 2:
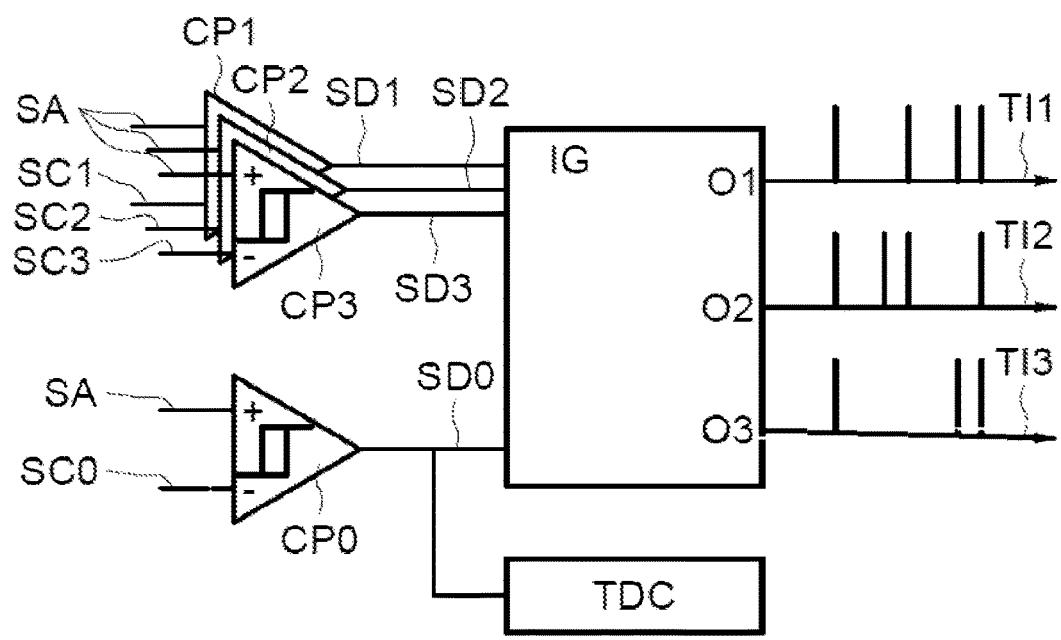
FIG. 2 illustrates a pulse generation device.

The receiver device comprises a pulse generation device IGD shown in more detail in FIG. 2.

The pulse generation device IGD comprises a plurality of comparators $CP_0$, $CP_1$, $CP_2$, $CP_3$ connected to the output of the amplifier AMP. Each comparator $CP_0$, $CP_1$, $CP_2$, $CP_3$ respectively receives, at the input, the amplified signal SA and a comparison signal $SC_0$, $SC_1$, $SC_2$, $SC_3$ each defining a threshold voltage. Each comparator $CP_0$, $CP_1$, $CP_2$, $CP_3$ is thus associated with a given threshold voltage.

The comparators $CP_0$, $CP_1$, $CP_2$, $CP_3$ are thus configured to detect when the threshold voltages are exceeded. These exceedances are respectively signaled by signals $SD_0$, $SD_1$, $SD_2$ and $SD_3$ at the output of the comparators $CP_0$, $CP_1$, $CP_2$ and $CP_3$.

In particular, the pulse generation device IGD preferably comprises a first comparator $CP_0$ used to detect when a threshold voltage of 0 volts has been exceeded.

The pulse generation device IGD further comprises a series of comparators $CP_1$, $CP_2$, $CP_3$ for detecting when other threshold voltages have been exceeded. In the embodiment shown, the pulse generation device IGD comprises three comparators. Nonetheless, a different number of comparators can be provided as a function of a desired detection resolution.

The pulse generation device IGD further comprises a time-to-digital converter TDC. Preferably, the time-to-digital converter TDC receives, at the input, the output from the comparator $CP_0$. The time-to-digital converter TDC is thus configured to measure a time between two detection sequences, with a detection sequence ending when no exceedance has been detected for a time that is greater than the transmission time of a symbol.

The pulse generation device IGD further comprises a pulse generator IG. The pulse generator IG comprises a plurality of inputs configured to receive the detection signals from the comparators $CP_1$, $CP_2$, $CP_3$.

The pulse generator IG is further configured to output a pulse as soon as a voltage threshold is detected by a comparator $CP_1$, $CP_2$, $CP_3$ to have been exceeded. Thus, the pulse generator comprises a plurality of outputs $O_1$, $O_2$, $O_3$, each output $O_1$, $O_2$, $O_3$ being associated with a detection respectively connected to the comparator $CP_1$, $CP_2$, $CP_3$.

The pulse generator IG can thus generate a plurality of pulse trains $TI_1$, $TI_2$, $TI_3$ when a plurality of voltage threshold exceedances has been detected by a plurality of comparators $CP_1$, $CP_2$ and $CP_3$ during receipt of the radio frequency signal.

Some of the pulses in these pulse trains $TI_1$, $TI_2$, $TI_3$ can be representative of symbols comprised in the radio frequency signal received.

Other pulses can result from noise comprised in the radio frequency signal received or from errors introduced into the radio frequency signal during the transmission thereof.

The pulse generator IG can in particular be formed by an AND type logic gate with a delay on one of the inputs thereof.

The receiver device $DIS_1$ further comprises a processing unit UT configured to implement an artificial neural network NN.

The processing unit UT can be a microprocessor for example.

This artificial neural network NN is stored as a computer program in a memory of the processing unit.

The neural network NN receives, at the input, the pulse trains $TI_1$, $TI_2$ and $TI_3$ generated by the pulse generator IG.

In particular, the artificial neural network is trained beforehand to recognize pulses representative of symbols in the pulse trains that it receives so as to generate corrected pulse trains in which the pulses resulting from noise or transmission errors are eliminated.

The pulses of the corrected pulse trains are thus representative of the symbols contained in the radio frequency signal.

In particular, the neural network represented allows the corrected pulse trains $TIC_1$, $TIC_2$ and $TIC_3$ to be generated.

The neural network thus outputs corrected pulse trains $TIC_1$, $TIC_2$ and $TIC_3$.

In particular, the neural network NN comprises a succession of neuron layers.

Each layer receives, at the input, data to which weights are applied and outputs output data after processing by neuron activation functions of the layer. This output data is transmitted to the next layer in the neural network.

The weights are data, more particularly parameters, of neurons that can be configured to obtain good output data.

The weights are adjusted during a learning phase that is generally a supervised learning phase, in particular by executing the neural network with already classified pulse trains from a reference database as input data.

Figure 3:
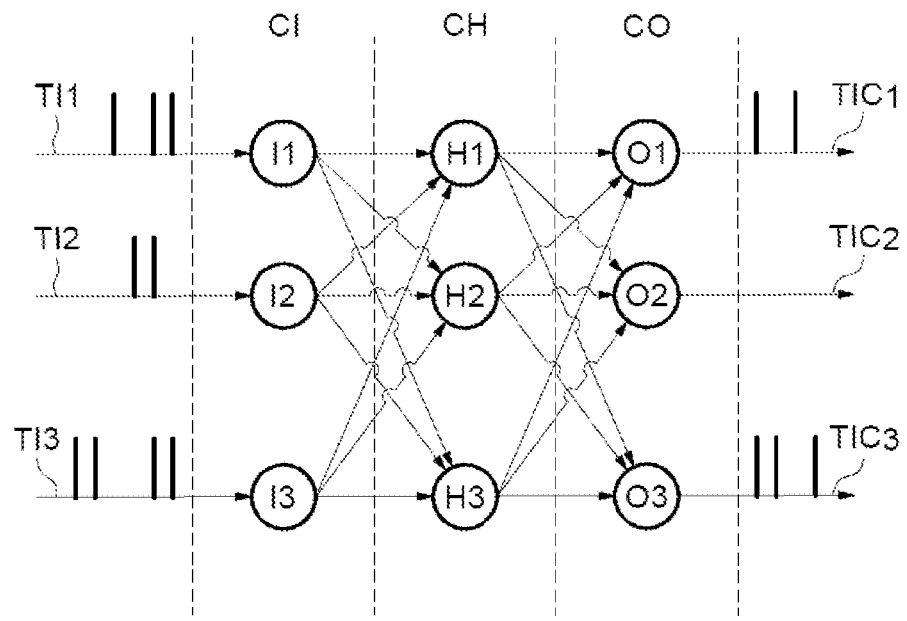
FIG. 3 illustrates a neural network correcting pulse trains.

For example, as shown in FIG. 3 by way of illustration, the first layer CI is an input layer comprising a neuron $I_1$ receiving the pulse train $TI_1$, a neuron I2 receiving the pulse train $TI_2$ and a neuron I3 receiving the pulse train $TI_3$.

The last layer CO is an output layer comprising a neuron $O_1$ transmitting the corrected pulse train $TIC_1$, a neuron I2 transmitting the corrected pulse train $TIC_2$ and a neuron I3 transmitting the corrected pulse train $TIC_3$.

The neural network NN further comprises one or more hidden layers CH between the input layer CI and the output layer CO. In FIG. 3, only one hidden layer CH is shown. This layer CH comprises neurons $H_1$, $H_2$ and $H_3$ receiving, at the input, the outputs from the neurons $I_1$, $I_2$ and $I_3$ of the input layer CI. The neurons $O_1$, $O_2$, $O_3$ of the output layer CO thus receive, at the input, the outputs from these neurons $H_1$, $H_2$ and $H_3$.

The hidden layers can be convolutional and/or propagation layers. These layers are configured to identify the pulses representative of symbols in the generated pulse trains.

The times measured by the time-to-digital converter between two detection sequences of the comparator $CP_0$ are used to define time windows during which the pulse trains are to be analyzed by the neural network NN.

The receiver device $DIS_1$ comprises a decoder DEC that can be implemented by the processing unit UT.

The decoder DEC is configured to identify the symbols in the corrected pulse trains that it receives.

In particular, the decoder DEC is configured to recognize the type of the radio frequency signal comprised in the header of the signal based on the identified symbols.

The decoder DEC is further configured to translate the identified symbols of the corrected pulse trains $TIC_1$, $TIC_2$, $TIC_3$ transmitted by the neural network NN into a binary data stream DAT representative of the information contained in the radio frequency signal, as a function of the identified type of the radio frequency signal.

Figure 4:
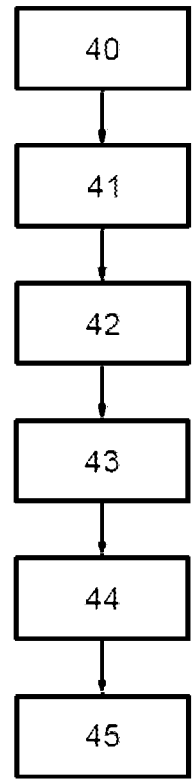
FIG. 4 illustrates an embodiment receiving method.

The receiver device $DIS_1$ is thus configured to implement a receiving method as shown in FIG. 4.

The receiving method comprises a receiving step 40 wherein the antenna ANT receives a radio frequency signal and converts same into an electric signal SE.

The receiving method then comprises an amplification step 41 wherein the amplifier AMP amplifies the electric signal SE produced by the antenna ANT. The amplified signal SA obtained is then transmitted to the comparators $CP_0$, $CP_1$, $CP_2$ and $CP_3$.

Thus, the method comprises a step 42 of detecting exceedances wherein the comparators $CP_0$, $CP_1$, $CP_2$ and $CP_3$ compare the amplified signal with the different threshold voltages. When the amplified signal exceeds a threshold voltage, the comparator $CP_0$, $CP_1$, $C_2$ and $CP_3$ associated with this threshold voltage emits a detection signal.

The method further comprises a step 43 of generating a pulse train by way of the pulse generator IG. Each pulse represents a detection of a threshold voltage being exceeded.

The pulse generator IG thus allows each detection of a threshold voltage being exceeded to be translated into a pulse.

The method then comprises a step 44 of generating the corrected pulse trains $TIC_1$, $TIC_2$, $TIC_3$.

In this step, the processing unit executes the neural network NN in such a way that the corrected pulse trains $TIC_1$, $TIC_2$, $TIC_3$ are generated from the generated pulse trains $TI_1$, $TI_2$, $TI_3$.

The corrected pulse trains $TIC_1$, $TIC_2$ and $TIC_3$ are then transmitted to the decoder.

The method then comprises a decoding step 45 implemented by the decoder DEC. In this decoding step, the decoder DEC firstly identifies the symbols in the corrected pulse trains $TIC_1$, $TIC_2$ and $TIC_3$.

The decoder DEC then determines the type of the radio frequency signal based on an identified symbol originating from the header of the radio frequency signal.

The decoder DEC then translates the identified symbols associated with the useful information into a binary data stream DAT representative of the useful information of the radio frequency signal, as a function of the determined type of the radio frequency signal.

Determining the type of the radio frequency signal in particular makes it possible to determine whether or not the radio frequency signal must be processed.

Thus, the generation of a pulse train based on a detection of voltage level exceedances allows the useful information to be extracted from the radio frequency signal without sampling the radio frequency signal.

Such a method thus makes it possible to reduce the power consumed in order to extract the useful information from a radio frequency signal.

Such a method further reduces the number of samples to be analyzed by analyzing only a small number of pulses. Such a method further avoids restrictive conditions regarding the bandwidth of the radio frequency signal received.

Figure 5:
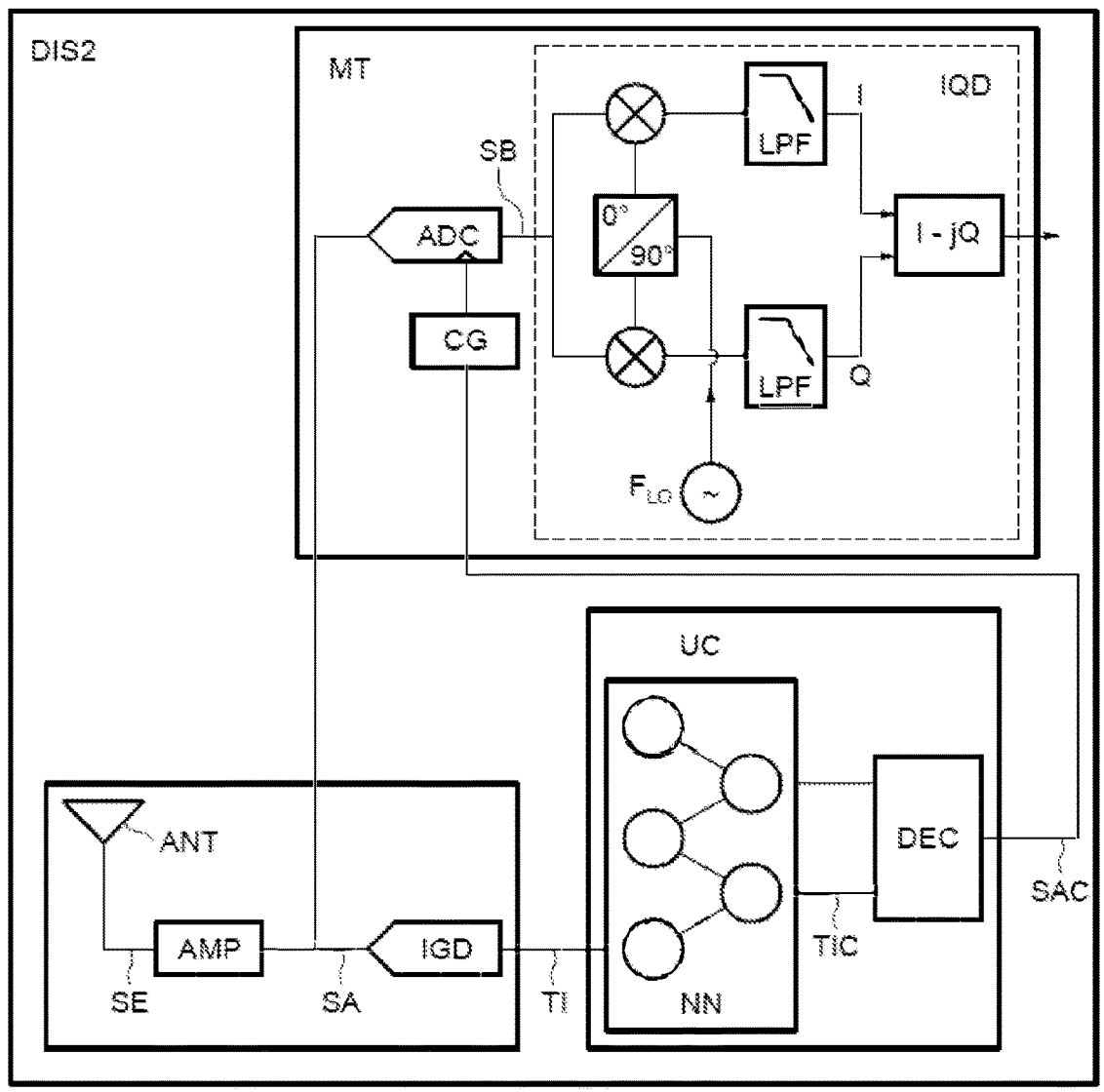
FIG. 5 illustrates another embodiment receiver device.

FIG. 5 shows a receiver device $DIS_2$ according to another embodiment of the invention, which can also be used as a software-defined radio.

In this case, the receiver device $DIS_2$ also comprises an antenna ANT, a low-noise amplifier AMP, a pulse generation device IGD and a processing unit UT as described hereinabove.

The receiver device in FIG. 5 differs from that in FIG. 1 in that the processing unit UT is not used to decode the useful information of the radio frequency signal based on the corrected pulse trains.

In particular, the useful information is extracted from the radio frequency signal using signal processor MT.

The signal processor comprises a high-frequency analogue-to-digital converter CAD configured to sample the amplified electric signal SA transmitted by the amplifier AMP. In particular, the signal processor comprises a clock generator CG configured such that it can generate a sampling clock. This sampling clock is used to time the sampling performed by the analogue-to-digital converter.

The signal processor MT further comprises an amplitude demodulator IQD, in particular a quadrature amplitude demodulator well known to a person skilled in the art, in particular the use thereof in software-defined radios.

The signal processor MT is configured to extract the useful information from a radio frequency signal of a given type.

The pulse generation device IGD and the processing unit UT are used to determine the type of the radio frequency signal and then to actuate the signal processor MT if the type of the signal is that for which the signal processor MT is configured.

In particular, the processing unit UT is configured to implement the neural network NN in order to generate corrected pulse trains from pulse trains generated by the pulse generation device, as described for the receiver device in FIG. 1.

Moreover, the decoder DEC is configured to identify a symbol, from the header of the signal, representative of an expected type of the radio frequency signal based on the corrected pulse trains, the expected type being one which can be processed by the signal processor MT.

The decoder DEC is thus configured to activate the signal processor MT when it has identified a symbol representative of the expected type.

The pulse generation device IGD and the processing unit UT can thus be used as a radio wake-up system to indicate that a radio frequency signal of the expected type has been received.

Figure 6:
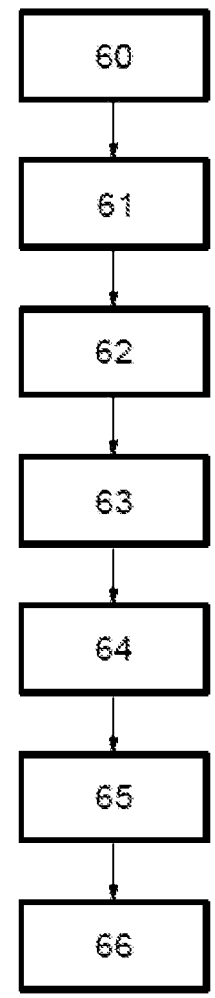
FIG. 6 illustrates another embodiment receiving method.

Thus, the receiver device $DIS_2$ in FIG. 5 is configured to implement a receiving method as shown in FIG. 6.

At the beginning of such a method, the clock generator CG is deactivated and thus does not consume power.

The receiving method comprises a receiving step 60 wherein the antenna ANT receives a radio frequency signal and converts same into an electric signal.

The receiving method then comprises an amplification step 61 wherein the amplifier AMP amplifies the electric signal SE produced by the antenna. The amplified signal SA obtained is then transmitted to the comparators of the pulse generation device IGD.

Thus, the method comprises a step 62 of detecting exceedances wherein the comparators compare the amplified signal with the different threshold voltages. When the amplified signal exceeds a threshold voltage, the comparator emits a detection signal.

The method further comprises a step 63 of generating a pulse train by way of the pulse generator of the pulse generation device IGD. Each pulse represents a detection of a threshold voltage being exceeded.

The pulse generator thus allows each detection of a threshold voltage being exceeded to be translated into a pulse.

The method then comprises a step 64 of determining the type of the radio frequency signal from each pulse train generated by the pulse generator.

The method then comprises a step 44 of generating the corrected pulse trains $TIC_1$, $TIC_2$, $TIC_3$.

In this step, the processing unit executes the neural network NN in such a way that the corrected pulse trains $TIC_1$, $TIC_2$, $TIC_3$ are generated from the generated pulse trains $TI_1$, $TI_2$, $TI_3$.

The corrected pulse trains $TIC_1$, $TIC_2$ and $TIC_3$ are then transmitted to the decoder.

The method then comprises a decoding step 45 implemented by the decoder DEC. In this decoding step, the decoder DEC identifies whether pulses in the corrected pulse trains correspond to a symbol representative of the expected type of the radio frequency signal.

If the decoder DEC identifies a symbol representative of the expected type from the corrected pulse trains, then the processing unit UT emits an activation signal SAC to the processor MT. In particular, the activation signal allows the clock generator CG to be activated.

Once the clock generator has been activated, the method includes a step 65 of sampling the amplified electric signal SA from the radio frequency signal received by the analogue-to-digital converter ADC. This sampling results in a digital signal SB representative of the radio frequency signal.

The method then comprises a step 66 of demodulating the digital signal SB by way of the amplitude demodulator IQD in order to be able to extract the useful information carried by the radio frequency signal.

Once the useful information has been extracted, the clock generator CG is deactivated to reduce the power consumption of the receiver device.

Figure 7:
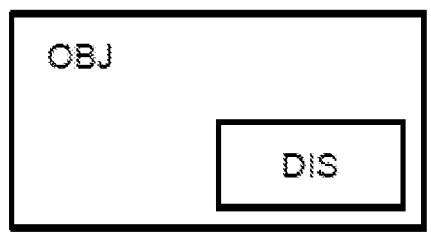
FIG. 7 illustrates an embodiment object comprising a receiver device.

FIG. 7 shows an object OBJ comprising a receiver device DIS that can be selected from among the receiver device $DIS_1$ shown in FIG. 1 and the receiver device $DIS_2$ shown in FIG. 5.

Such an object OBJ can in particular be used in the Internet of things. In particular, such an object is thus configured to receive data from a remote server or appliance, for example, via the Internet. Such an object OBJ makes it possible for data to be received via a radio frequency signal while consuming little power.

What is claimed is:

1. A method for receiving data in a radio frequency transmission, the method comprising:
   receiving a radio frequency signal of a specific type;
   converting the radio frequency signal into an electric signal;
   detecting, at least once, at least one voltage level in the electric signal;
   generating at least one input pulse train representative of each detection;
   generating, by an artificial neural network implemented on a processing unit, from the at least one input pulse train, at least one corrected pulse train comprising pulses representative of the specific type of the radio frequency signal; and
   determining the specific type of the radio frequency signal from the at least one corrected pulse train.

2. The method according to claim 1, wherein the artificial neural network comprises a succession of neuron layers, and the generating the at least one corrected pulse train further comprises:
   retrieving, by an input neuron layer, the at least one input pulse train;
   converting, by at least one hidden convolutional and/or propagation neuron layer, the retrieved at least one input pulse train into the at least one corrected pulse train; and
   transmitting, by an output neuron layer, the at least one corrected pulse train.

3. The method according to claim 2, further comprising each neuron layer applying respective weights to its respective inputs to generate its respective outputs.

4. The method according to claim 3, further comprising, during an artificial neural network learning phase, adjusting the weights by executing the artificial neural network using already-classified pulse trains from a reference database as input data.

5. The method according to claim 2, wherein the converting comprises:
   recognizing, by the at least one hidden convolutional and/or propagation neuron layer, pulses representative of symbols in the retrieved at least one input pulse train; and
   eliminating, by the at least one hidden convolutional and/or propagation neuron layer, pulses in the retrieved at least one input pulse train resulting from noise or transmission errors.

6. The method according to claim 2, wherein a nature of the radio frequency signal is identified based on the at least one corrected pulse train.

7. The method according to claim 2, further comprising decoding the radio frequency signal from the at least one corrected pulse train, as a function of the determined specific type of the radio frequency signal.

8. The method according to claim 1, further comprising, after determining the specific type of the radio frequency signal, sampling then processing the electric signal in accordance with the determined specific type of the radio frequency signal.

9. The method according to claim 1, wherein the radio frequency signal is selected from among a Wi-Fi signal, a Bluetooth signal, or a Long Term Evolution (LTE) signal.

10. A radio frequency receiver device comprising:
    an input interface configured to:
       receive a radio frequency signal of a specific type; and
       convert the radio frequency signal into an electric signal;
    a detector configured to detect at least one voltage level in the electric signal;
    a pulse generator configured to generate input pulse trains representative of the voltage levels detected; and
    a processing unit configured to:
       implement an artificial neural network to generate, from the input pulse trains, corrected pulse trains comprising pulses representative of the specific type of the radio frequency signal; and
       determine the specific type of the radio frequency signal from the corrected pulse trains.

11. The radio frequency receiver device according to claim 10, wherein the artificial neural network comprises a succession of neuron layers including:
    an input neuron layer for retrieving the input pulse trains;

at least one hidden convolutional and/or propagation neuron layer for converting the retrieved input pulse trains into the corrected pulse trains; and an output neuron layer for transmitting the corrected pulse trains.

12. The radio frequency receiver device according to claim 11, wherein each neuron layer comprises respective weights used to generate its respective outputs from its respective inputs.

13. The radio frequency receiver device according to claim 12, wherein the weights are pre-trained by executing the artificial neural network using already-classified pulse trains from a reference database as input data.

14. The radio frequency receiver device according to claim 11, wherein the at least one hidden convolutional and/or propagation neuron layer is configured to:

recognize pulses representative of symbols in the retrieved input pulse trains; and eliminate pulses in the retrieved input pulse trains resulting from noise or transmission errors.

15. The radio frequency receiver device according to claim 11, further comprising a decoder configured to identify the specific type of the radio frequency signal from the corrected pulse trains.

16. The radio frequency receiver device according to claim 15, wherein the decoder is configured to decode the radio frequency signal from the corrected pulse trains, as a function of the determined specific type of the radio frequency signal.

17. The radio frequency receiver device according to claim 10, wherein the detector comprises at least one comparator configured to detect the at least one voltage level of the electric signal by comparing the electric signal with at least one threshold.

18. The radio frequency receiver device according to claim 10, further comprising a signal processor configured to, after a nature of the radio frequency signal has been determined, sample and then process the electric signal in accordance with the determined specific type of the radio frequency signal.

19. An object comprising:
a radio frequency receiver device comprising:
an input interface configured to:
receive a radio frequency signal of a specific type; and
convert the radio frequency signal into an electric signal;
a detector configured to detect at least one voltage level in the electric signal;
a pulse generator configured to generate input pulse trains representative of the voltage levels detected; and
a processing unit configured to:
implement an artificial neural network to generate, from the input pulse trains, corrected pulse trains comprising pulses representative of the specific type of the radio frequency signal; and
determine the specific type of the radio frequency signal from the corrected pulse trains.

20. The object according to claim 19, wherein the artificial neural network comprises a succession of neuron layers including:
an input neuron layer for retrieving the input pulse trains;
at least one hidden convolutional and/or propagation neuron layer for converting the retrieved input pulse trains into the corrected pulse trains; and
an output neuron layer for transmitting the corrected pulse trains.

21. The object according to claim 19, wherein the object is coupled to a network, and is configured to receive data from a remote server or appliance via the radio frequency signal.

* * * * *